United States Patent
Baughman et al.

(10) Patent No.: US 12,106,218 B2
(45) Date of Patent: Oct. 1, 2024

(54) DEEP FORECASTED HUMAN BEHAVIOR FROM DIGITAL CONTENT

(71) Applicant: International Business Machines Corporation, Armonk, NY (US)

(72) Inventors: Aaron K. Baughman, Silver Spring, MD (US); Gray F. Cannon, Miami, FL (US); Ryan L. Whitman, Spalding, GA (US)

(73) Assignee: International Business Machines Corporation, Armonk, NY (US)

( * ) Notice: Subject to any disclaimer, the term of this patent is extended or adjusted under 35 U.S.C. 154(b) by 1941 days.

(21) Appl. No.: 15/898,832

(22) Filed: Feb. 19, 2018

(65) Prior Publication Data

US 2019/0258933 A1 Aug. 22, 2019

(51) Int. Cl.
*G06N 3/084* (2023.01)
*G06F 16/9535* (2019.01)
(Continued)

(52) U.S. Cl.
CPC ......... *G06N 3/084* (2013.01); *G06F 16/9535* (2019.01); *G06N 3/045* (2023.01); *H04L 67/025* (2013.01); *H04L 67/535* (2022.05)

(58) Field of Classification Search
CPC .. G06F 16/9535; G06N 3/0454; G06N 4/084; H04L 67/025; H04L 67/535
See application file for complete search history.

(56) References Cited

U.S. PATENT DOCUMENTS 5,354,957 A 10/1994 Robertson
5,461,699 A 10/1995 Arbabi et al.
(Continued)

FOREIGN PATENT DOCUMENTS

KR 20160144297 A 12/2016

OTHER PUBLICATIONS

Khani, M. G. et al., "A novel approach for website aesthetic evaluation based on convolutional neural networks," 2016 Second International Conference on Web Research (ICWR), 2016, pp. 48-53 (Year: 2016).*
(Continued)

*Primary Examiner* — Alexey Shmatov
*Assistant Examiner* — Devika S Maharaj
(74) *Attorney, Agent, or Firm* — Yee & Associates, P.C.

(57) ABSTRACT

Modifying digital content based on predicted future user behavior is provided. Trends in propagation values corresponding to a layer of nodes in an artificial neural network are identified based on measuring the propagation values at each run of the artificial neural network. The trends in the propagation values are forecasted to generate predicted propagation values at a specified future point in time. The predicted propagation values are applied to the layer of nodes in the artificial neural network. Predicted website analytics values corresponding to a set of website variables of interest for the specified future point in time are generated based on running the artificial neural network with the predicted propagation values. A website corresponding to the set of website variables of interest is modified based on the predicted website analytics values corresponding to the set of website variables of interest for the specified future point in time.

20 Claims, 10 Drawing Sheets

US 12,106,218 B2
Page 2

(51) Int. Cl.
*G06N 3/045* (2023.01)
*H04L 67/025* (2022.01)
*H04L 67/50* (2022.01)

(56) References Cited

U.S. PATENT DOCUMENTS

| | | | |
|---|---|---|---|
| 5,956,702 | A | 9/1999 | Matsouka et al. |
| 6,125,105 | A | 9/2000 | Edwards et al. |
| 6,216,119 | B1 | 4/2001 | Jannarone |
| 6,236,942 | B1 | 5/2001 | Bush |
| 8,194,986 | B2 | 6/2012 | Conwell |
| 8,756,184 | B2 * | 6/2014 | Li ................ G06N 20/00 706/25 |
| 9,384,444 | B2 * | 7/2016 | Kortum ............ G06N 3/02 |
| 10,453,099 | B2 * | 10/2019 | Korpusik ........ G06Q 30/0269 |
| 10,650,432 | B1 * | 5/2020 | Joseph ............ G06N 3/08 |
| 2002/0049685 | A1 * | 4/2002 | Yaginuma ........ G06N 3/02 706/21 |
| 2002/0103512 | A1 | 8/2002 | Echauz et al. |
| 2006/0251338 | A1 | 11/2006 | Gokturk et al. |
| 2009/0113049 | A1 | 4/2009 | Nasle et al. |
| 2010/0169177 | A1 * | 7/2010 | Griffith ............ G06F 16/958 709/224 |
| 2010/0169792 | A1 * | 7/2010 | Ascar ............ G06F 11/3438 715/744 |
| 2014/0068011 | A1 * | 3/2014 | Zhang ............ G06N 5/02 709/219 |
| 2015/0007065 | A1 * | 1/2015 | Krishnamoorthy ... G06F 3/0483 715/760 |
| 2015/0213363 | A1 * | 7/2015 | Lahav ............ G06N 5/04 706/11 |
| 2015/0310334 | A1 * | 10/2015 | Huang ............ H04L 43/08 706/46 |
| 2017/0091615 | A1 | 3/2017 | Liu et al. |
| 2017/0098159 | A1 * | 4/2017 | Sharifi ............ G06F 3/0481 |
| 2017/0251081 | A1 * | 8/2017 | Roychowdhury ..... G06N 3/084 |
| 2017/0330029 | A1 * | 11/2017 | Turcot ............ G06V 30/194 |
| 2018/0018553 | A1 * | 1/2018 | Bach ............ G06N 3/02 |
| 2018/0025273 | A1 * | 1/2018 | Jordan ............ G06Q 40/025 706/21 |
| 2018/0107902 | A1 * | 4/2018 | Yang ............ G06K 9/6269 |
| 2018/0114139 | A1 * | 4/2018 | Kucera ............ G06Q 30/0254 |
| 2019/0065956 | A1 * | 2/2019 | Qian ............ G06N 3/0454 |
| 2019/0102684 | A1 * | 4/2019 | Beran ............ G06F 11/3438 |
| 2019/0197398 | A1 * | 6/2019 | Jamali ............ G06N 3/084 |
| 2019/0228105 | A1 * | 7/2019 | Ma ............ H04L 67/306 |

OTHER PUBLICATIONS

Bradenburg, "Applying Deep Learning to Time Series Forecasting with TensorFlow", mapr.com Blog, Jun. 10, 2017, 11 pages. https://mapr.com/blog/deep-learning-tensorflow/.

Polson et al., "Deep Learning for Short-Term Traffic Flow Prediction", Transportation Research Part C: Emerging Technologies, vol. 79, Jun. 2017, 29 pages.

Jia et al., "Traffic Flow Prediction with Rainfall Impact Using a Deep Learning Method", Journal of Advanced Transportation, vol. 2017, Aug. 9, 2017, 11 pages.

Lee et al., "Deep Learning-Based Corporate Performance Prediction Model Considering Technical Capability", Stainability, vol. 9, May 26, 2017, 12 pages.

Wang et al., "Intelligent web traffic mining and analysis", Journal of Network and Computer Applications, vol. 28, Jan. 7, 2004, pp. 147-165.

Khotanzad et al., "An Adaptive Modular Artificial Neural Network Hourly Load Forecaster and its Implementation at Electric Utilities", IEEE Transactions on Power Systems, vol. 10, No. 3, Aug. 1995, pp. 1716-1722.

Napagoda, "Web Site Visit Forecasting Using Data Mining Techniques", International Journal of Scientific and Technology Research, vol. 2, Issue 12, Dec. 2013, 5 pages.

Yusifov, "Web Traffic Mining using Neural Networks", World Academy if Science, Engineering and Technology International Journal of Industrial and Manufacturing Engineering, vol. 2, No. 9, 2008, 3 pages.

Kong et al., "Method and System for Utilizing Convolutional Neural Network for Predicting Click-Through Rate (CTR)", IP.com Database Technical Disclosure No. IPCOM000251880D, Dec. 8, 2017, 6 pages.

Zhang et al., "DNN-Based Prediction Model for Spatio-Temporal Data", Proceedings of the 24th ACM International Conference on Advances in Geographic Information Systems, Article No. 92, Oct. 2016, 4 pages.

* cited by examiner

DEEP FORECASTED HUMAN BEHAVIOR FROM DIGITAL CONTENT

BACKGROUND

1. Field

The disclosure relates generally to deep learning and more specifically to using forecasted human behavior trends in a convolutional neural network to predict future web analytics values corresponding to a set of digital content variables of interest within digital content of a webpage on a website at a future time.

2. Description of the Related Art

Deep learning is a branch of machine learning based on a set of algorithms that attempts to model high-level abstractions in data by using artificial neural network architectures composed of multiple non-linear transformations. Learning can be supervised or unsupervised. Deep learning architectures have been applied to fields, such as, for example, computer vision, speech recognition, and natural language processing, where these architectures have produced results comparable to and in some cases superior to human experts.

Deep learning uses a cascade of multiple layers of processing nodes for feature extraction and transformation. Each successive layer of nodes uses the output from the previous layer of nodes as input. The deep architecture is organized as a graph. The nodes in the graph are connected by links to propagate activation, calculated at the origin, to the destination nodes. Each link has a weight that determines the relative strength and sign of the connection and each node applies an activation function to all of the weighted sum of incoming activations. The activation function is given as a hard threshold, a sigmoid function, or a hyperbolic tangent, for example.

Such deep architectures learn progressively and improve performance on tasks by considering examples, generally without task-specific programming. For example, in image recognition, these deep architectures might learn to identify images that contain cats by analyzing example images that have been manually labeled as "cat" or "no cat" and using the results to identify cats in other images. These deep architectures are able to do this without any prior knowledge about cats, such as cats have fur, tails, whiskers, and cat-like faces. Instead, these deep architectures evolve their own set of relevant characteristics from the training data that they process.

SUMMARY

According to one illustrative embodiment, a computer-implemented method for modifying digital content based on predicted future user behavior is provided. A computer identifies trends in propagation values corresponding to a layer of nodes in an artificial neural network based on measuring the propagation values at each run of the artificial neural network. The computer forecasts the trends in the propagation values corresponding to the layer of nodes in the artificial neural network to generate predicted propagation values at a specified future point in time. The computer applies the predicted propagation values to the layer of nodes in the artificial neural network. The computer generates predicted website analytics values corresponding to a set of website variables of interest for the specified future point in time based on running the artificial neural network with the predicted propagation values. The computer modifies a website corresponding to the set of website variables of interest based on the predicted website analytics values corresponding to the set of website variables of interest for the specified future point in time. According to other illustrative embodiments, a computer system and computer program product for modifying digital content based on predicted future user behavior are provided.

DETAILED DESCRIPTION

Figure 1:
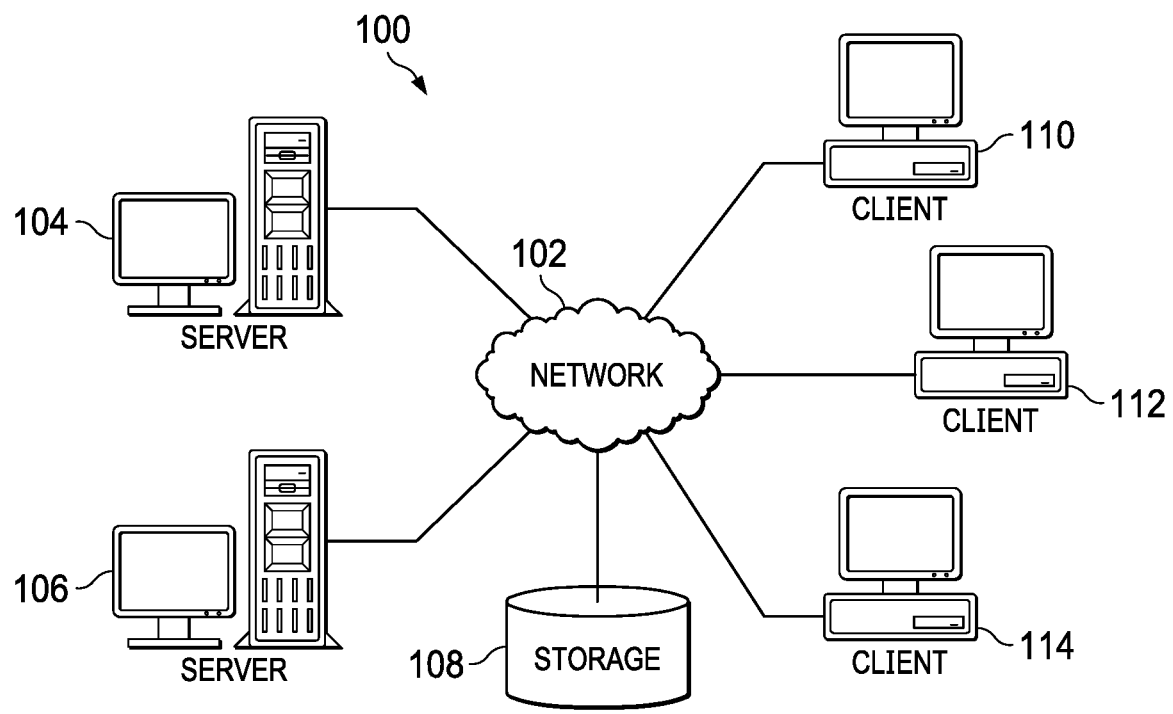
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
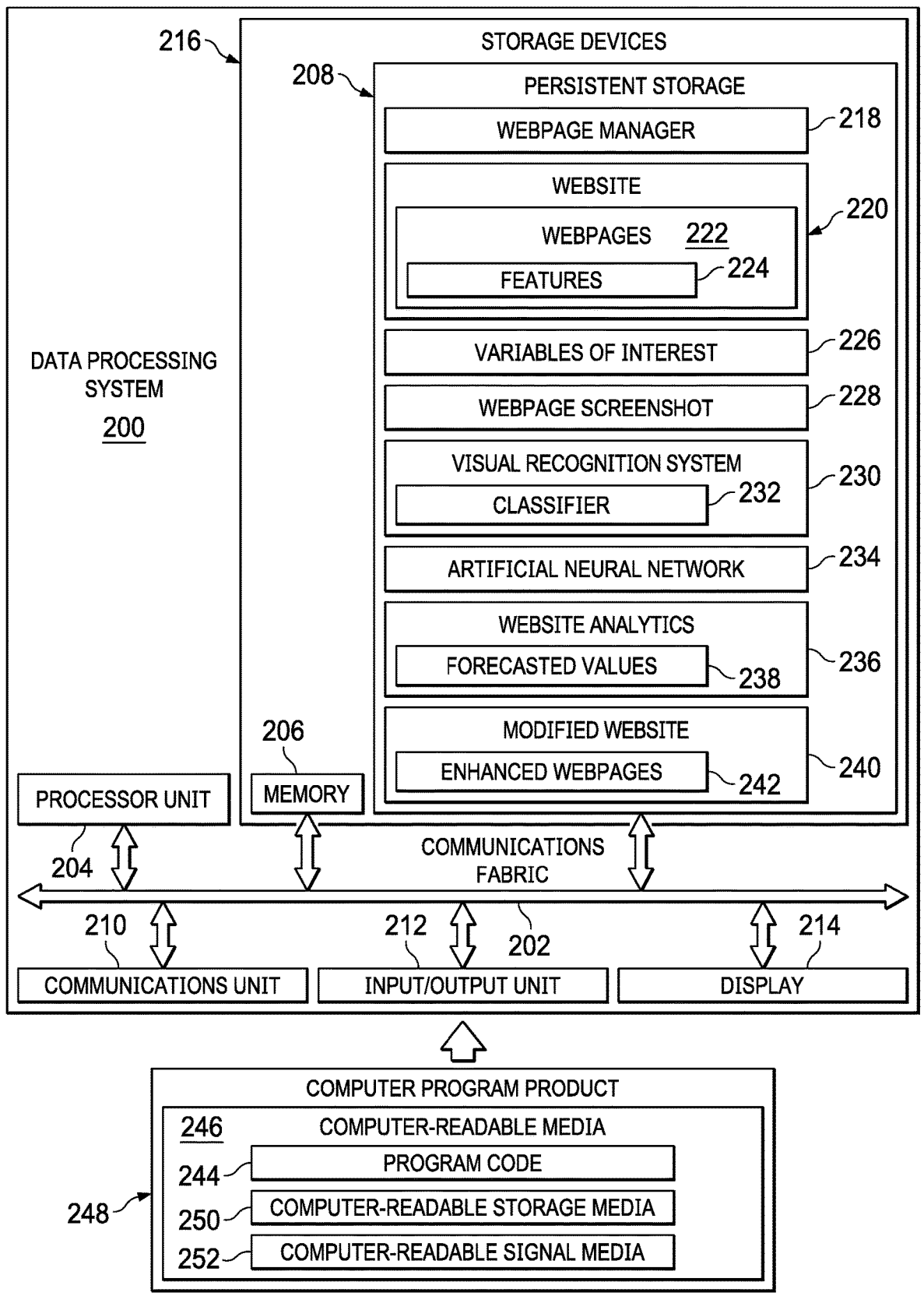
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of services to client devices. For example, server 104 may host a set of one or more websites for a set of one or more digital entities and server 106 may provide web analytics for the set of websites. However, it should be noted that in alternative illustrative embodiments, server 104 and server 106 may both host websites and provide web analytics for those websites. Further, it should be noted that server 104 and server 106 may each represent a cluster of servers in a datacenter or may be servers in a cloud environment.

Client 110, client 112, and client 114 also connect to network 102. Clients 110, 112, and 114 are clients of server 104 and/or server 106. In this example, clients 110, 112, and 114 are illustrated as personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, gaming devices, and the like, with wire or wireless communication links to network 102. Users of clients 110, 112, and 114 may utilize clients 110, 112, and 114 to access the websites and web analytics services hosted by server 104 and server 106. Further, server 104 and server 106 may provide other information, such as applications and programs, to clients 110, 112, and 114.

Storage 108 is a network storage device capable of storing any type of data in a structured format or an unstructured format. In addition, storage 108 may represent a plurality of network storage devices. Further, storage 108 may store identifiers for a plurality of client devices; identifiers for a plurality of web sites; a plurality of different webpages corresponding to the plurality of websites; website analytics corresponding to the plurality of websites; and the like. Furthermore, storage unit 108 may store other types of data, such as authentication or credential data that may include user names, passwords, and biometric data associated with system users and administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on communications server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 106 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may include a graphics processing unit. Alternatively, data processing system 200 may include a graphics processing unit, in addition to or instead of processor unit 204, coupled to communications fabric 202.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores webpage manager 218. However, it should be noted that even though webpage manager 218 is illustrated as residing in persistent storage 208, in an alternative illustrative embodiment webpage manager 218 may be a separate component of data processing system 200. For example, webpage manager 218 may be a hardware component coupled to communication fabric 202 or a combination of hardware and software components. In another alternative illustrative embodiment, a first portion of webpage manager 218 may be located in data processing system 200 and a second portion of webpage manager 218 may be located in a second data processing system, such as server 104 or client 110 in FIG. 1. In yet another alternative illustrative embodiment, webpage manager 218 may be located in client devices instead of, or in addition, to data processing system 200.

Webpage manager 218 controls the process of forecasting human behavior trends to predict future web analytic values for a set of one or more variables of interest corresponding to a popular webpage on website 220 and automatically modifying the webpage based on predicted future web analytics values. Website 220 may represent any type of website owned by a digital entity. Website 220 includes webpages 222. Webpages 222 represent a set of one or more webpages that contain features 224. Features 224 may represent digital content, such as, for example, text, images, graphics, logos, advertisements, banners, and the like. Features 224 have a topology within a particular webpage. A topology is the way in which constituent features or elements of the webpage are interrelated or arranged within the webpage.

Variables of interest 226 represent a plurality of different sets of variables of interest, each different set of variables of interest relate to a different webpage in webpages 222. Variables of interest 226 may represent, for example, number of visits to a website, type of visitors to the website, number of visits to each particular webpage on the web site, number of interactions with each particular feature or element of each particular webpage, and the like.

Webpage screenshot 228 represents a screenshot of a particular webpage on website 220 that a client device user sent to data processing system 200 for web analytics processing by webpage manager 218. Webpage screenshot 228 may represent a screenshot of the entire webpage or only a portion of the entire webpage. The particular webpage may be, for example, a most popular webpage in webpages 222. Most popular means a webpage having a highest number of visits as compared to other webpages in webpages 222.

Webpage manager 218 utilizes visual recognition system 230 to analyze webpage screenshot 228 to quickly and accurately detect information, such as, for example, style, background, objects, features, and elements, contained within webpage screenshot 228. In this example, visual recognition system 230 includes classifier 232. Visual recognition system 230 inputs the detected information regarding webpage screenshot 228 into classifier 232 to identify a name of the website and the webpage corresponding to webpage screenshot 228.

Webpage manager 218 inputs the names of the website and webpage, along with webpage screenshot 228, variables of interest 226, and other pertinent data, such as initial weights, biases, and activation functions, into artificial neural network 234 to forecast human behavior trends to predict future web analytic values, which correspond to variables of interest 226. The predicted future web analytic values may be, for example, website analytics 236 that include forecasted values 238.

Artificial neural network 234 is a data processing algorithm. In an alternative illustrative embodiment, artificial neural network 234 is a hardware processing device. Artificial neural network 234 is organized in layers. The layers are made up of a number of interconnected nodes that contain an activation function. An activation function of a node defines the output of that node given the input. Data patterns are presented to artificial neural network 234 via an input layer, which communicates to one or more hidden layers where the actual processing is done via a system of weighted connections. The hidden layers are internal representations of incoming data. The hidden layers then link to an output layer where the answer is output.

Artificial neural network 234 modifies the weights of the connections according to the input data patterns that it is presented with. Artificial neural network 234 learns via a supervised process that occurs with each cycle (i.e., each time artificial neural network 234 is run with a new input data pattern) through a forward activation flow of outputs, and the backpropagation of weight adjustments. In other words, this is a two-step process where the inputs are fed into artificial neural network 234 via forward propagation and multiplied with initially random weights and biases before they are transformed via an activation function. Once the forward propagation is complete, the backpropagation step measures the error from the final output to the expected output by calculating the partial derivatives of the weights generating the error and adjusts them. In other words, backpropagation adjusts the weights by calculating the gradient of a loss function. Once the weights are adjusted, artificial neural network 234 repeats the process of the forward propagation and backpropagation steps to minimize the error rate until convergence.

More simply, when artificial neural network 234 is initially presented with a data pattern, artificial neural network 234 makes a random guess as to what it might be. Artificial neural network 234 then determines how far its answer was from the actual one and makes an appropriate adjustment to its connection weights. Within each hidden layer node is an activation function, such as a sigmoid function, linear function, or rectified linear unit, which polarizes network activity and helps it to stabilize. Once artificial neural network 234 is trained, webpage manager 218 utilizes artificial neural network 234 as an analytical tool to generate website analytics 236 with forecasted values 238. The output of a forward propagation run is then the predicted model for the data, which replaces previous values with forecasted values 238.

Website analytics 236 correspond to variables of interest 226, which correspond to website 220. Website analytics 236 may include information regarding website 220, such as, for example, number of visits to website 220, number of visits to each particular webpage in webpages 222, number of user interactions with each particular feature in features 224, and the like. Forecasted values 238 represent values for website analytics 236 at a future point in time, such as, for example, one day, one week, two weeks, one month, three months, six months, or one year in the future. In other words, forecasted values 238 represent predictions of future user behavior regarding features 224 and webpages 222 on website 220.

Webpage manager 218 may automatically modify webpages 222 on website 220 based on data contained within forecasted values 238 to form modified website 240 with enhanced webpages 242. For example, enhanced webpages 242 may include a fewer number of webpages based on forecasted values 238 indicating that one or more webpages on website 220 will not be utilized or viewed by users. Further, enhanced webpages 242 may include rearranged features. For example, webpage manager 218 may make popular features more prominent within enhanced webpages 242 and less popular features made less prominent. Furthermore, webpage manager 218 may remove one or more features if forecasted values 238 indicate that these one or more features will not have any user interactions. Moreover, webpage manager 218 may add one or more images to enhanced webpages 242 that relate to features of enhanced webpages 242. Thus, webpage manager 218 enhances user experience by generating and displaying enhanced webpages 242.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of nontangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Digital entities typically utilize analytics dashboards that automatically populate with predetermined metrics and breakdowns. A digital entity is any domain that owns digital assets, such as websites or any other type of digital experience, that are accessed by users for information or entertainment purposes, for example. An analytics dashboard is a user interface that provides statistical and basic analytics tools for marketing and search engine optimization purposes. Inevitably, a digital entity's data needs extend beyond the scope of these current analytics dashboards and the current period of time. Digital entities want to know user behavior patterns around their digital assets before users begin interacting with these digital assets. However, recognizing feature components on a digital asset is difficult and requires deep artificial neural networks with an approach of forecasted backpropagation.

Today, many digital entity users are unable to find the needed web analytics data within the analytics dashboard interface because the digital entity users lack familiarity with the analytics dashboard. In this situation, possible outcomes include the digital entity users aborting the data analytics search, retrieving incorrect data analytics, and adding the task to a web analyst's queue to find the relevant data analytics. In addition, initial digital assets are bootstrapped by fuzzy market research and experience that are not relevant to changing human and technology behaviors.

The ability to predict website visiting patterns has significant value to digital asset owners for targeting their businesses to the right customers at the right time. Understanding customer behavior trends is important in decision making and reacting to changes in customer behavior patterns. Existing analytics dashboards include browser plugins that use hypertext markup language (HTML) elements to provide web metrics in an overlay. These overlays are often called "heat maps" or "activity maps." These plugins do not use visual recognition technology. In addition, these existing web analytics dashboards do not support forecasting features.

As a result, these existing analytics dashboards suffer from several disadvantages as compared to computer vision approaches. First, users must install the browser plugins and activate them. Further, these browser plugins are not available on mobile browsers. Furthermore, these browser plugins will miss visual features, such as image content and background designs, which may be necessary to identify webpage variants.

Illustrative embodiments learn placement of advertisements, content, and user interactive experience from user behavior patterns for access and consumption. Illustrative embodiments enable discovery of these user behavior patterns from any digital asset or fractal thereof by utilizing artificial neural networks, such as convolutional neural networks and residual neural networks, to determine user digital content access behavior trends before the behavior occurs. For example, illustrative embodiments can take a partial screenshot of a digital asset, such as, for example, a webpage, displayed on a mobile device, such as, for example, a smart phone, and determine the web analytics of each feature or element of that digital asset. Deep convolution neural networks utilizing computer vision learn the topology of these features and elements contained within the digital asset irrespective of location of these features and elements within the digital asset. A residual neural network then uses forecasted weight updates during backpropagation to determine future web analytics of the digital asset before the web analytics are available.

Illustrative embodiments utilize a web application that allows users to upload screenshots of webpages and then returns relevant web analytics data regarding the webpages. The web application uses visual recognition technology to identify which webpage is shown in the screenshot. To enable this recognition, illustrative embodiments train a classifier with screenshots of the various webpages from different websites. The web application inserts the identified webpage name into a web analytics application programming interface (API) request, so illustrative embodiments can return the relevant web analytics data for the identified webpage to the users.

The computer vision aided querying approach is advantageous because it requires no specifications from the user requesting web analytics, but merely a screenshot or a portion thereof of the webpage. Computer vision deals with how computers gain understanding from digital images. Computer vision acquires, processes, and analyzes the digital images to extract data from the digital images to understand the information in the digital images. Thus, by utilizing illustrative embodiments a user with little web analytics experience can quickly get the web analytics the user desires without learning the specifics of the web analytics reporting suite. This benefit is amplified when the web application is trained to identify features, such as webpage variants, that are tagged using analytics variables that are even less well-known among users. Webpage variants are different layouts of a webpage. For example, a webpage may be displayed differently on different devices, such as personal computers, laptops, handheld computers, and smart phones, based on size of a display screen on the different devices.

As a result, illustrative embodiments by utilizing artificial neural networks that apply computer vision are able to: 1) determine visual-based digital content human behavior derivation; 2) determine visual-based fractal digital content human behavior derivation; 3) determine human behavior around digital content before it occurs; 4) utilize backpropagation of forecasted derivative weights, biases, and activation functions; and 5) correlate visual-based content with user patterns through deep learning to output forecasted human behavior trends. Further, illustrative embodiments may decrease network load by decreasing the number and/or size of images being sent via the network due to modified webpages. In addition, illustrative embodiments may decrease an amount of power usage of client devices due to a decreased number of pixels that have to be shown in displays of the client devices due to the modified webpages.

Figure 3:
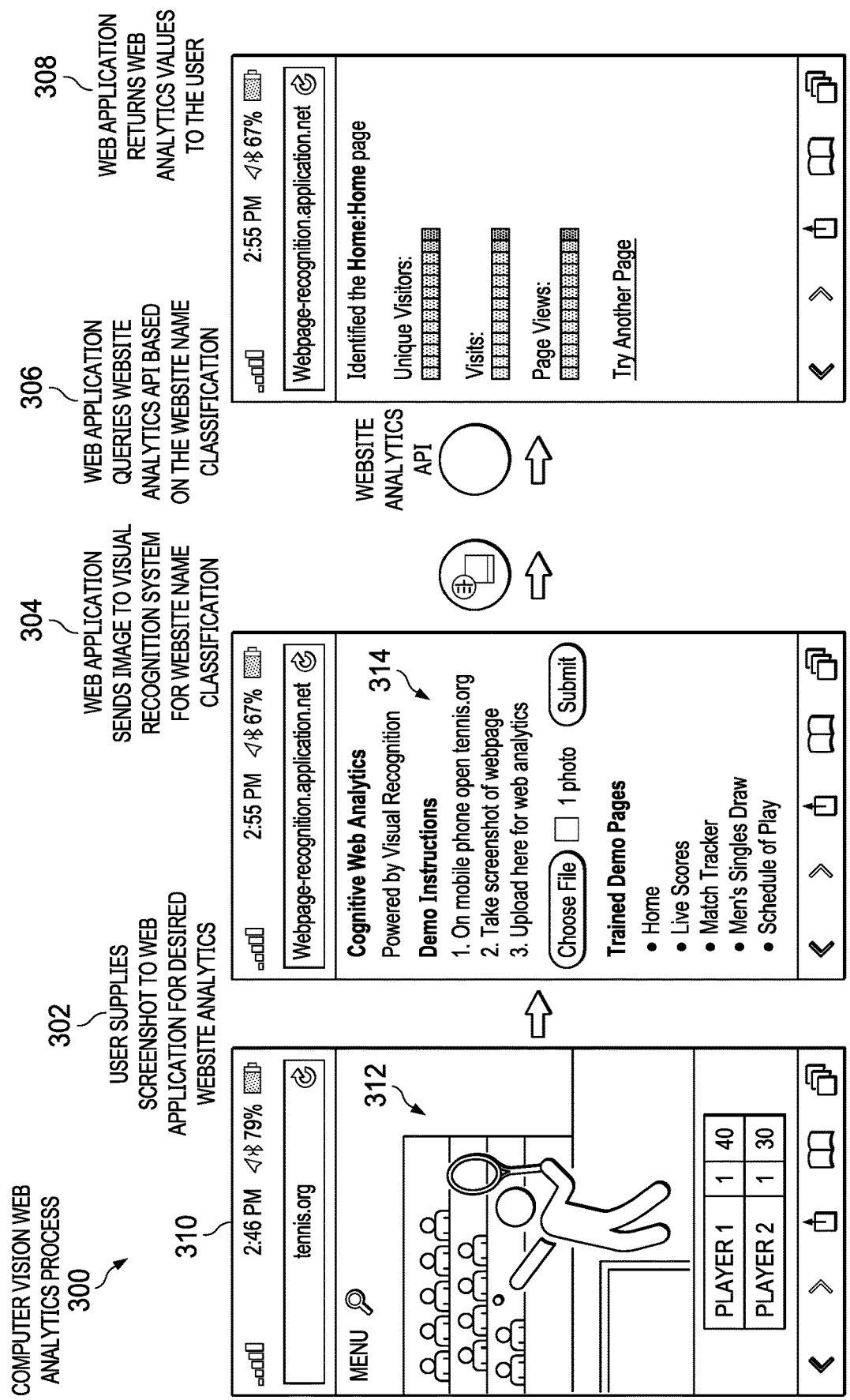
FIG. 3 is a diagram illustrating an example of a computer vision web analytics process in accordance with an illustrative embodiment.

With reference now to FIG. 3, a diagram illustrating an example of a computer vision web analytics process is depicted in accordance with an illustrative embodiment. Computer vision web analytics process 300 may be implemented in a computer, such as server 106 in FIG. 1 or data processing system 200 in FIG. 2. In this example, computer vision web analytics process 300 includes steps 302, 304, 306, and 308.

At step 302, a user of client device 310 supplies screenshot 312 to a web application for desired web analytics. In this example, client device 310 is a smart phone. However, client device 310 may represent any type of client device used to access webpages. Screenshot 312 is a screenshot of a webpage on a website corresponding to tennis.org. It should be noted that tennis.org is not a real website and is intended as an example only. The web application may be, for example, webpage manager 218 in FIG. 2. In addition, the web application may display instructions 314 to the user of client device 310.

At step 304, the web application sends screenshot 312 to a visual recognition system for website name classification. At step 306, the web application queries a website analytics API based on the website name classification identified in step 304. At step 308, the web application returns future web analytics values corresponding to a future point in time to the user of client device 310.

Figure 4:
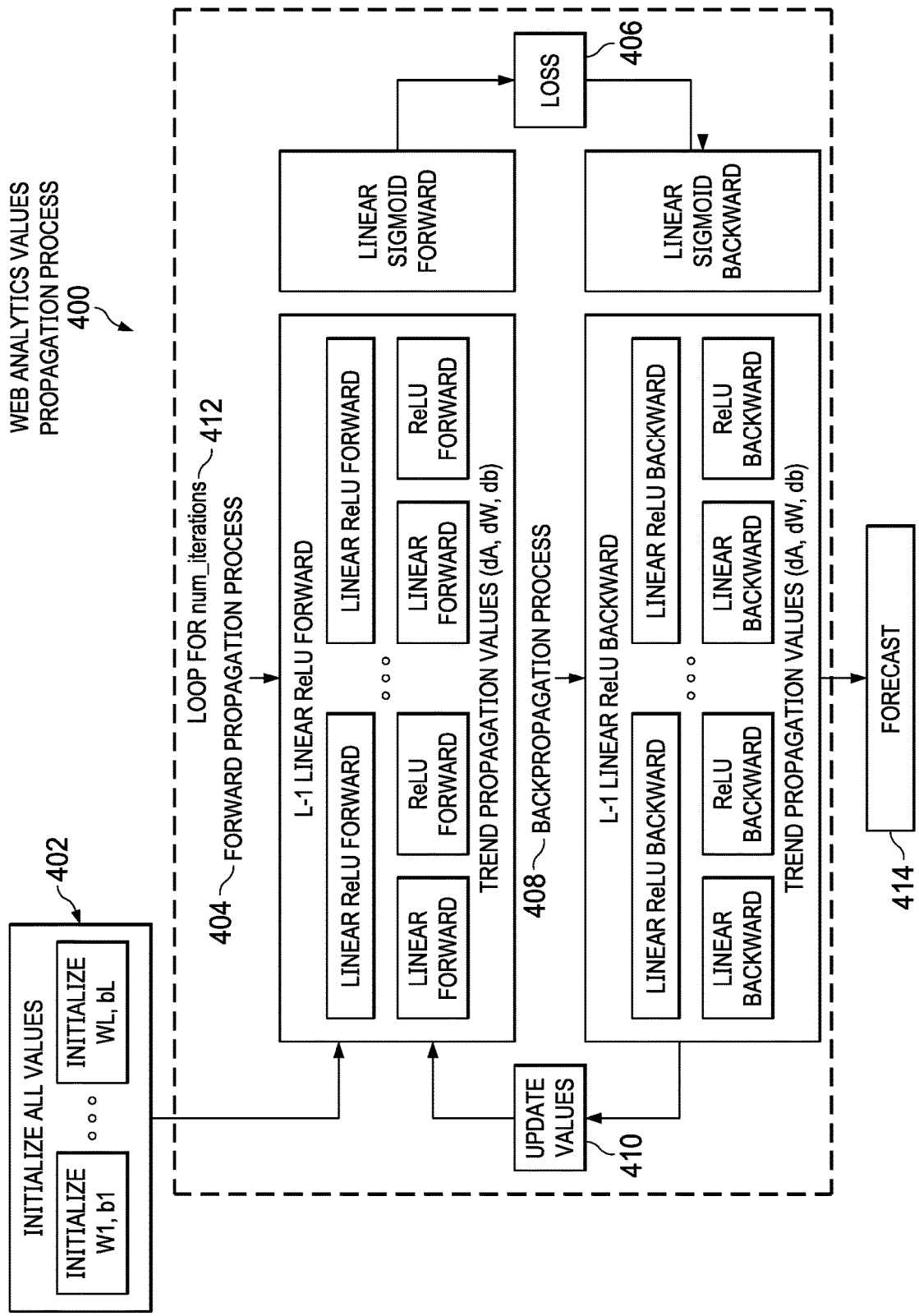
FIG. 4 is a diagram illustrating an example of a web analytics values propagation process in accordance with an illustrative embodiment.

With reference now to FIG. 4, a diagram illustrating an example of a web analytics values propagation process is depicted in accordance with an illustrative embodiment. Web analytics values propagation process 400 may be implemented in a computer, such as server 106 in FIG. 1 or data processing system 200 in FIG. 2.

At 402, web analytics values propagation process 400 initializes all input values, which include values for a set of variables of interest corresponding to a webpage, a screenshot of the webpage or a portion thereof, as well as initial weights, biases, and activation functions. The webpage may be, for example, the webpage corresponding to screenshot 312 in FIG. 3. Web analytics values propagation process 400 inputs the initialized values into forward propagation process 404 for processing.

Web analytics values propagation process 400 feeds the output of forward propagation process 404 into loss function 406. Loss function 406 specifies how training penalizes the deviation between predicted and actual values. Loss function 406 passes this information to backpropagation process 408 to adjust weight values, biases, and activation functions using forecasted results to produce update values 410. Backpropagation process 408 feeds update values 410 back into forward propagation process 404. Forward propagation process 404 then applies the forecasted results of update values 410. In other words, forward propagation process 404 replaces the previous values with the forecasted values.

Web analytics values propagation process 400 performs this loop for a number of iterations 412 until convergence. At the end of the loop for the number of iterations 412, web analytics values propagation process 400 generates forecast 414. Forecast 414 represents forecasted web analytics values for the webpage at a future time, such as forecasted values 238 of website analytics 236 in FIG. 2.

Figure 5:
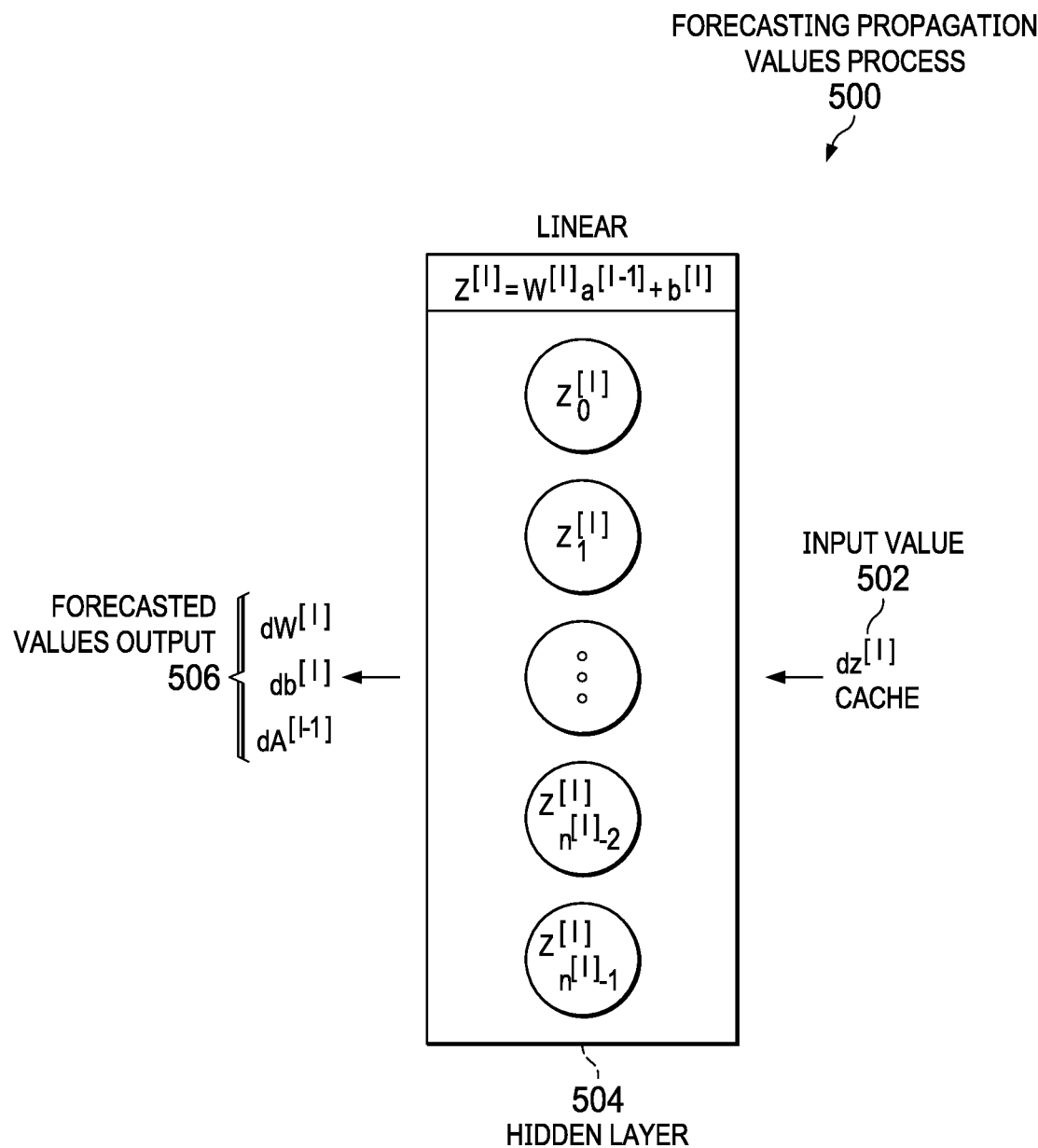
FIG. 5 is a diagram illustrating an example of a forecasting propagation values process in accordance with an illustrative embodiment.

With reference now to FIG. 5, a diagram illustrating an example of a forecasting propagation values process is depicted in accordance with an illustrative embodiment. Forecasting propagation values process 500 may be implemented in a computer, such as server 106 in FIG. 1 or data processing system 200 in FIG. 2.

Forecasting propagation values process 500 retrieves input value 502, which in this example is the derivative of Z (dZ), from a cache and inputs input value 502 into hidden layer 504 of an artificial neural network, such as artificial neural network 234 in FIG. 2, for processing. Hidden layer 504 generates forecasted values output 506, which in this example is derivative weight (dW), derivative bias (db), and derivative activation function (dA), based on input value 502.

Forecasting propagation values process 500 generates forecasted values output 506 utilizing the following formulas:

$$dW^{[l]} = \frac{\partial \mathcal{L}}{\partial W^{[l]}} = \frac{1}{m} dZ^{[l]} A^{[l-1]T}$$

$$db^{[l]} = \frac{\partial \mathcal{L}}{\partial b^{[l]}} = \frac{1}{m} \sum_{i=1}^{m} dZ^{[l](i)}$$

$$dA^{[l-1]} = \frac{\partial \mathcal{L}}{\partial A^{[l-1]}} = W^{[l]T} dZ^{[l]}.$$

Forecasting propagation values process 500 forecasts differences in weights, biases, and activation functions, while saving the forecasted values into the cache for backpropagation.

Figure 6:
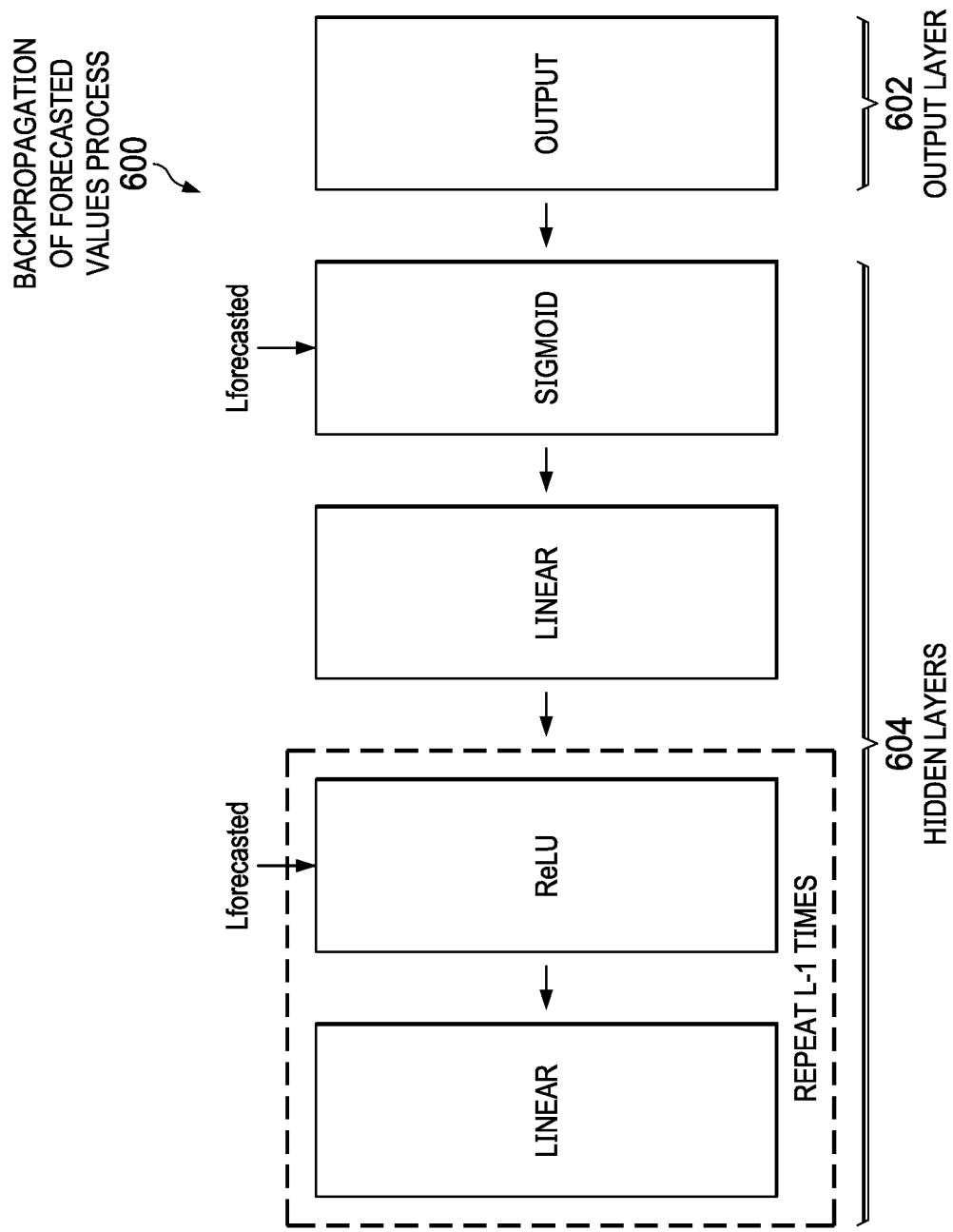
FIG. 6 is a diagram illustrating an example of a back-propagation of forecasted values process in accordance with an illustrative embodiment.

With reference now to FIG. 6, a diagram illustrating an example of a backpropagation of forecasted values process is depicted in accordance with an illustrative embodiment. Backpropagation of forecasted values process 600 may be implemented in a computer, such as server 106 in FIG. 1 or data processing system 200 in FIG. 2.

Backpropagation of forecasted values process 600 includes output layer 602 and hidden layers 604, which are contained within an artificial neural network, such as artificial neural network 234 in FIG. 2. Hidden layers 604 output forecasted web analytics values, such as forecasted values output 506 in FIG. 5.

However, it should be noted that hidden layers 604 are intended as examples only. In other words, backpropagation of forecasted values process 600 may include more or fewer hidden layers than illustrated. Also, it should be noted that each successive hidden layer in hidden layers 604 utilizes a different activation function, such as a sigmoid function, a linear function, a rectified linear unit, and a linear function, respectively. However, alternative illustrative embodiments may utilize the activation functions in a different order and utilize other types of activation functions.

Figure 7:
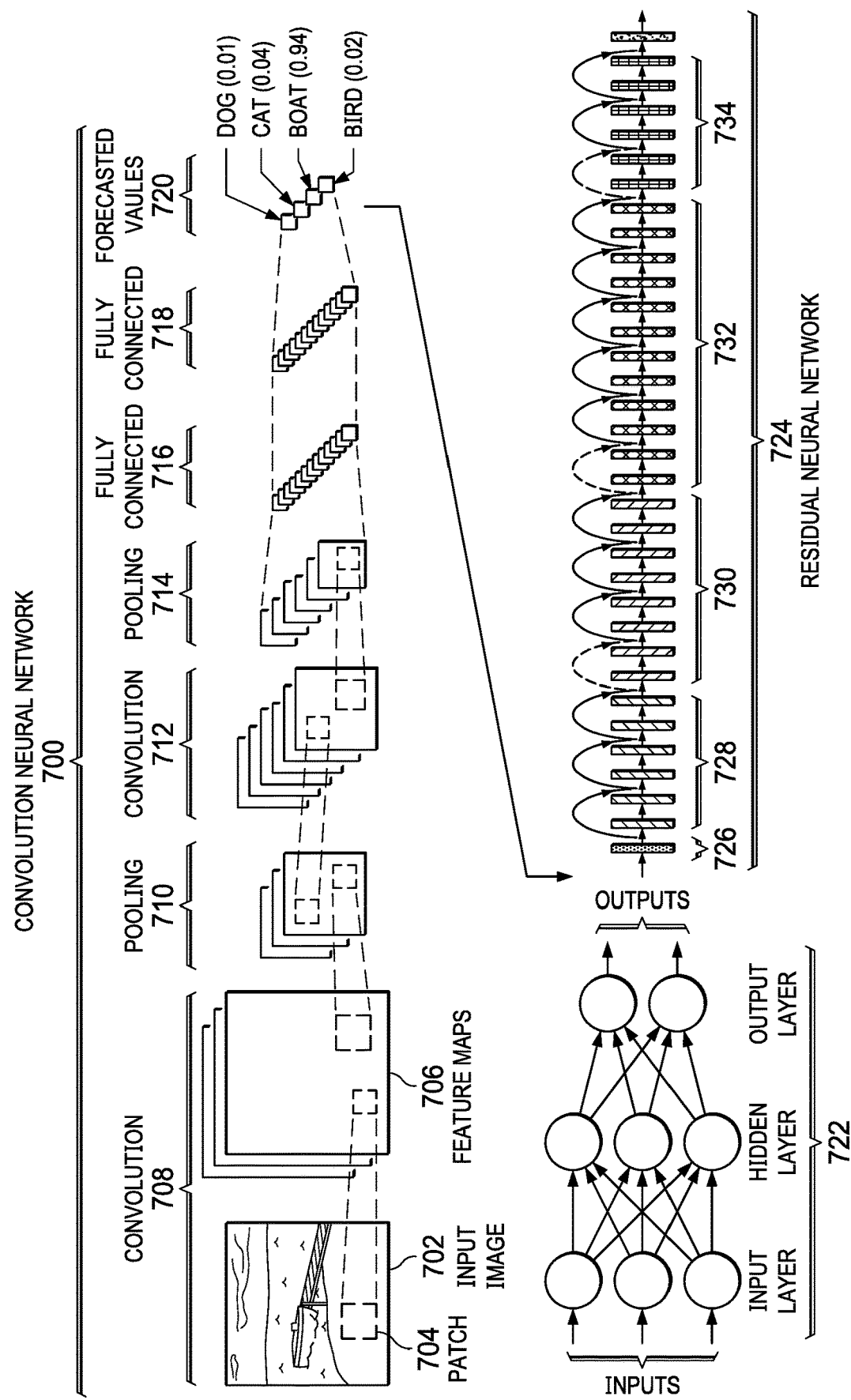
FIG. 7 is a diagram illustrating an example of a convolution neural network in accordance with an illustrative embodiment.

With reference now to FIG. 7, a diagram illustrating an example of a convolution neural network is depicted in accordance with an illustrative embodiment. Convolution neural network 700 may be implemented in a computer, such as server 106 in FIG. 1 or data processing system 200 in FIG. 2.

Convolution neural network 700 is a class of artificial neural networks, such as artificial neural network 234 in FIG. 2, that is applied to the processing and analyzing of digital images, such as webpages or other digital experiences. Convolution neural network 700 consists of an input layer and an output layer, as well as multiple hidden layers. The hidden layers consist of convolution layers, pooling layers, and fully connected layers.

Convolution layers apply a convolution operation to the input, passing the result to the next layer. A convolution layer reduces the number of parameters by only processing a small patch, portion, or data cube of the entire image. Convolution neural network 700 randomly selects the small patch from the image.

Pooling layers combine the outputs of node clusters at one layer into a single node in the next layer. For example, max pooling uses the maximum value from the cluster of nodes at the prior layer. As another example, average pooling uses an average value from the cluster of nodes at the prior layer.

Fully connected layers connect every node in one layer to every node in a next layer. Convolution neural network 700 shares weights in convolutional layers, which means that the same filter is used for each patch (e.g., receptive field) in the layer. This reduces memory footprint and improves computer performance.

In this example, convolution neural network 700 receives input image 702 as input to the input layer. In this example, input image 702 is an image of boats, which may be included in a webpage. Convolution neural network 700 randomly selects patch 704 within input image 702 for processing based on applied filters. The reason for randomly selecting only a patch within the entire image is that features in one patch are likely to be useful for other patches, thus, reducing computational cost to the computer by decreasing a need for processor resources. Convolution neural network 700 generates features maps 706.

In this example, convolution neural network 700 includes convolution layer 708, pooling layer 710, convolution layer 712, pooling layer 714, fully connected layer 716, and fully connected layer 718. Each node in convolution layers 708 and 712 processes image data for only its respective patch or receptive field to extract features. In other words, each node will only process a small contiguous region of pixels in the input. Each node in pooling layers 710 and 714 combine outputs from convolution layer 708 and 712, respectively, to produce a single output to the next layer. In other words, pooling layers 710 and 714 aggregate features together to generate better features for classification.

Fully connected layers 716 and 718 connect all the nodes between the different layers to generate forecasted values 720. In this example, forecasted values 720 include dog at 1 percent, cat at 4 percent, boat at 94 percent, and bird at 2 percent. In other words, convolution neural network 700 is 94 percent confident that input image 702 is of a boat. Interconnected nodes 722 is merely to illustrate interconnections between nodes of the input layer, hidden layers, and the output layer.

Illustrative embodiments feed forecasted values 720 into residual neural network 724, which is another class of artificial neural networks. Residual neural network 724 utilizes short cuts to jump over layers. Motivation for skipping layers is to avoid the problem of vanishing gradients by reusing activation from a previous layer until the next to the current one has learned its weight. In other words, this skipping process forces residual neural network 724 to recall previously learned information by pushing forecasted weights forward. However, it should be noted that residual neural network 724 is a fully connected neural network and consists of symmetric layers having substantially the same number of nodes so that a level of forecasting will not be forgotten.

In this example, residual neural network 724 includes layers 726, 728, 730, 732, and 734. Layer 726 may represent forecasted values for one day into the future, layers 728 may represent forecasted values for one week into the future, layers 730 may represent forecasted values for one month into the future, layers 732 may represent forecasted values for six months into the future, and layers 734 may represent forecasted values for one year into the future, for example.

Figure 8:
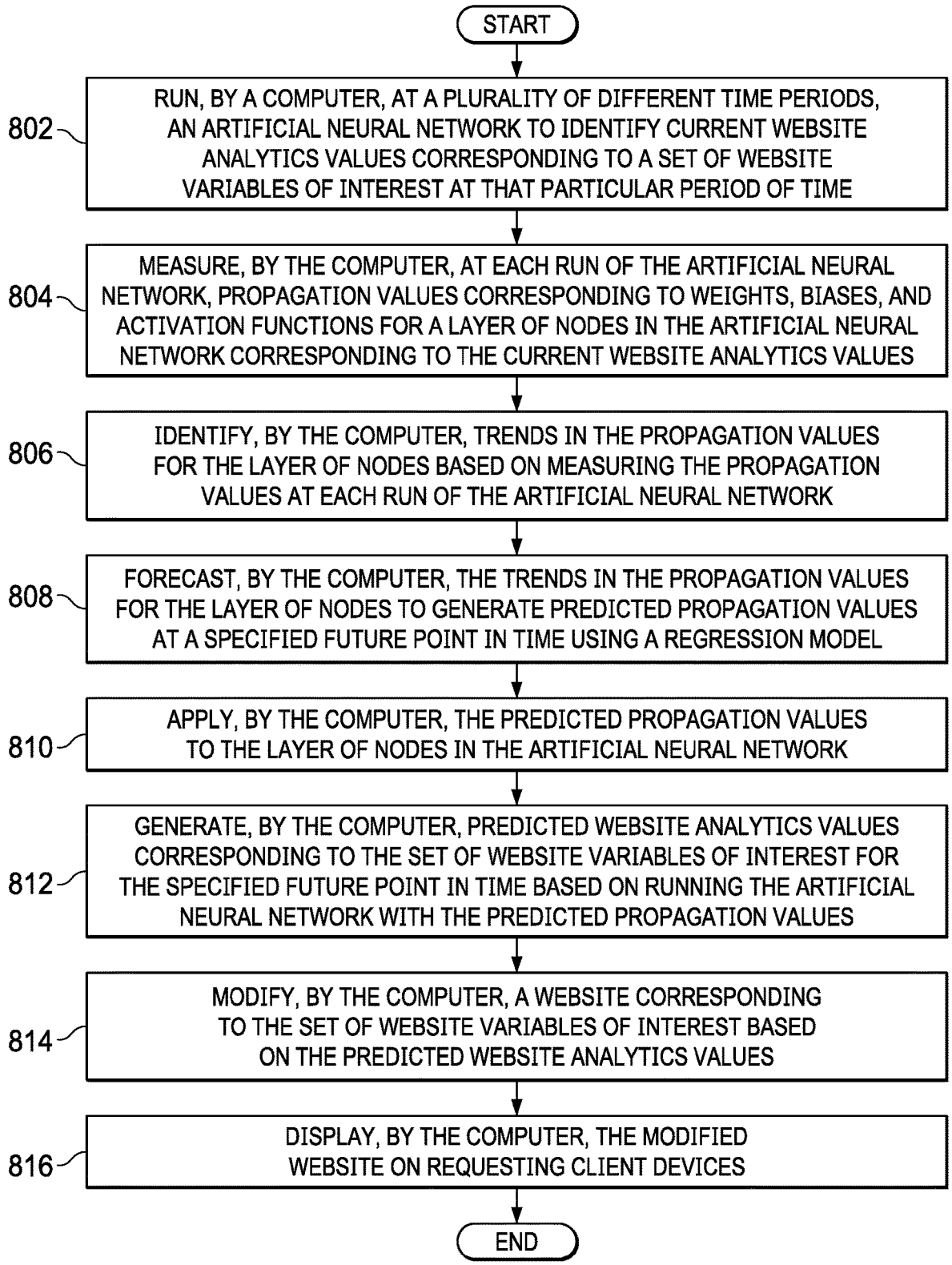
FIG. 8 is a flowchart illustrating a process for automatically modifying a website based on predicted website analytics values of a future time in accordance with an illustrative embodiment.

With reference now to FIG. 8, a flowchart illustrating a process for automatically modifying a website based on predicted website analytics values of a future time is shown in accordance with an illustrative embodiment. The process shown in FIG. 8 may be implemented in a computer, such as, for example, server 106 in FIG. 1 or data processing system 200 in FIG. 2.

The process begins when the computer runs, at a plurality of different time periods, an artificial neural network to identify current website analytics values corresponding to a set of website variables of interest at that particular period of time (step 802). The computer measures, at each run of the artificial neural network, propagation values corresponding to weights, biases, and activation functions for a layer of nodes in the artificial neural network corresponding to the current website analytics values (step 804). The computer identifies trends in the propagation values for the layer of nodes based on measuring the propagation values at each run of the artificial neural network (step 806).

The computer forecasts the trends in the propagation values for the layer of nodes to generate predicted propagation values at a specified future point in time using a regression model (step 808). The computer applies the predicted propagation values to the layer of nodes in the artificial neural network (step 810). The computer generates predicted website analytics values corresponding to the set of website variables of interest for the specified future point in time based on running the artificial neural network with the predicted propagation values (step 812).

The computer modifies a website corresponding to the set of website variables of interest based on the predicted website analytics values (step 814). The computer may automatically modify the website by, for example, removing unnecessary webpages, removing unnecessary features from webpages, rearranging features of webpages, adding images related to features to webpages, and the like. The computer displays the modified website on requesting client devices (step 816). Thereafter, the process terminates.

Figure 9:
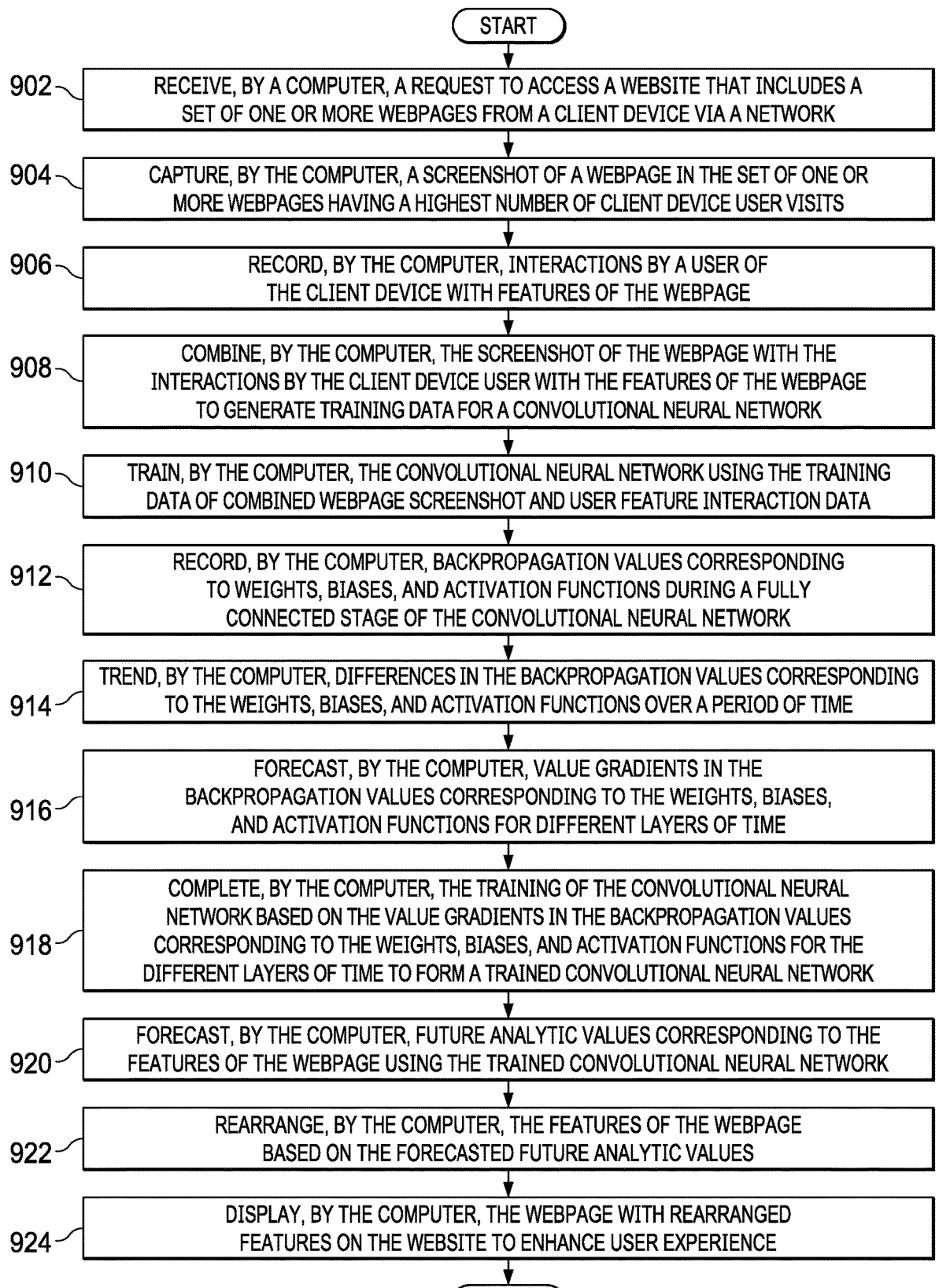
FIG. 9 is a flowchart illustrating a process for automatically rearranging features of a webpage based on forecasted future analytics values in accordance with an illustrative embodiment.

With reference now to FIG. 9, a flowchart illustrating a process for automatically rearranging features of a webpage based on forecasted future analytics values is shown in accordance with an illustrative embodiment. The process shown in FIG. 9 may be implemented in a computer, such as, for example, server 106 in FIG. 1 or data processing system 200 in FIG. 2.

The process begins when the computer receives a request to access a web site that includes a set of one or more webpages from a client device via a network (step 902). The computer captures a screenshot of a webpage in the set of one or more webpages having a highest number of client device user visits (step 904). The computer records interactions by the client device user with features of the webpage (step 906).

The computer combines the screenshot of the webpage with the interactions by the client device user with the features of the webpage to generate training data for a convolutional neural network (step 908). The computer trains the convolutional neural network using the training data of combined webpage screenshot and user feature interaction data (step 910). The computer records backpropagation values corresponding to weights, biases, and activation functions during a fully connected stage of the convolutional neural network (step 912).

The computer trends differences in the backpropagation values corresponding to the weights, biases, and activation functions over a period of time (step 914). The computer forecasts value gradients in the backpropagation values corresponding to the weights, biases, and activation functions for different layers of time (step 916). The computer completes the training of the convolutional neural network based on the value gradients in the backpropagation values corresponding to the weights, biases, and activation functions for the different layers of time to form a trained convolutional neural network (step 918).

The computer forecasts future analytic values corresponding to the features of the webpage using the trained convolutional neural network (step 920). The computer rearranges the features of the webpage based on the forecasted future analytic values (step 922). For example, the computer may make features that client device users will interact with more often in the future more prominent in the webpage and features that will have fewer user interactions less prominent based on the forecasted future analytic values. Further, the computer may remove or add features to the webpage based on the forecasted future analytic values. The computer displays the webpage with rearranged features on the website to enhance user experience (step 924). Thereafter, the process terminates.

Figure 10:
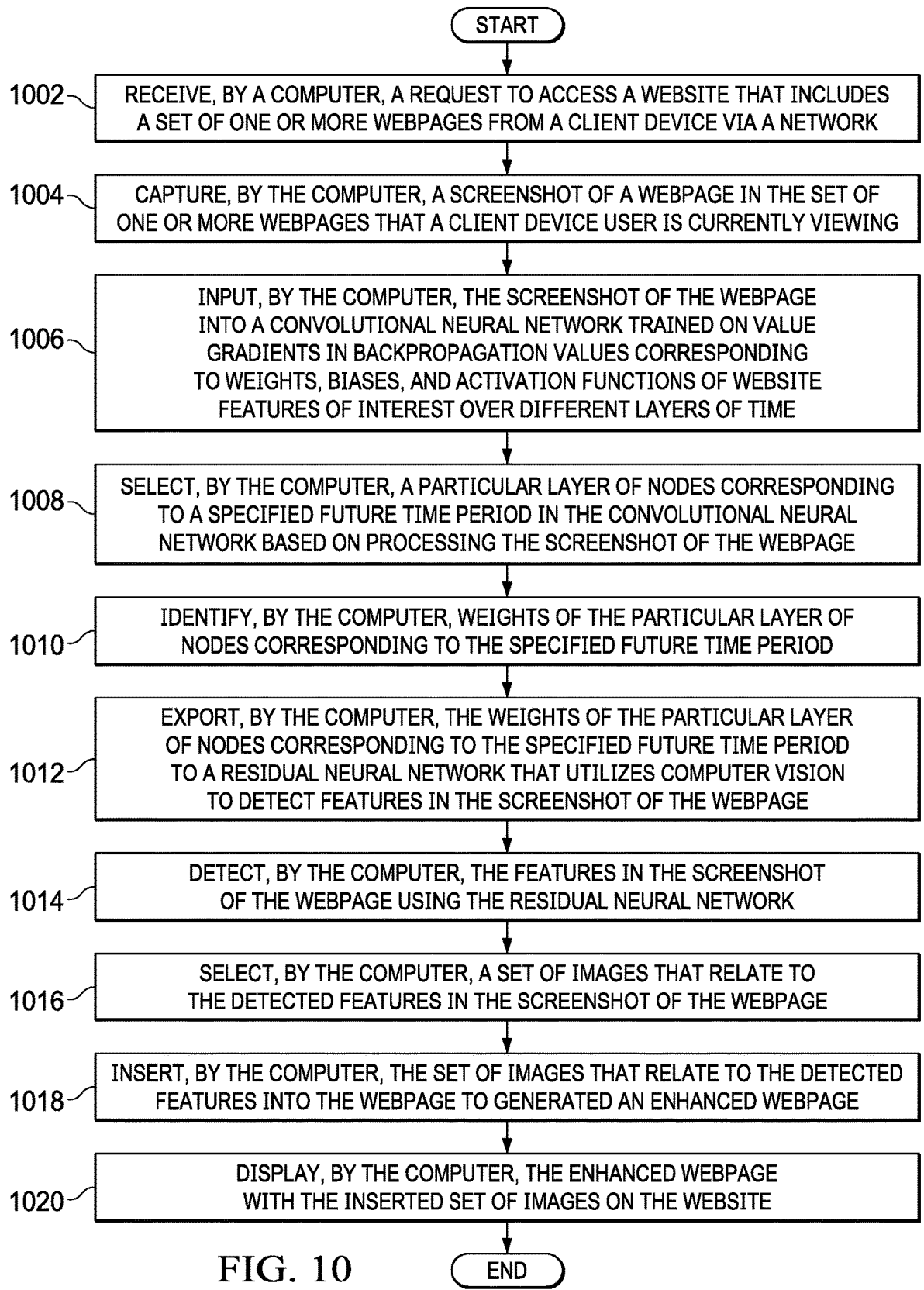
FIG. 10 is a flowchart illustrating a process for automatically inserting images into a webpage in accordance with an illustrative embodiment.

With reference now to FIG. 10, a flowchart illustrating a process for automatically inserting images into a webpage is shown in accordance with an illustrative embodiment. The process shown in FIG. 10 may be implemented in a computer, such as, for example, server 106 in FIG. 1 or data processing system 200 in FIG. 2.

The process begins when the computer receives a request to access a website that includes a set of one or more webpages from a client device via a network (step 1002). The computer captures a screenshot of a webpage in the set of one or more webpages that a client device user is currently viewing (step 1004). The computer inputs the screenshot of the webpage into a convolutional neural network trained on value gradients in backpropagation values corresponding to weights, biases, and activation functions of website features of interest over different layers of time (step 1006).

The computer selects a particular layer of nodes corresponding to a specified future time period in the convolutional neural network based on processing the screenshot of the webpage (step 1008). The computer identifies weights of the particular layer of nodes corresponding to the specified future time period (step 1010). The computer exports the weights of the particular layer of nodes corresponding to the specified future time period to a residual neural network that utilizes computer vision to detect features in the screenshot of the webpage (step 1012).

The computer detects the features in the screenshot of the webpage using the residual neural network (step 1014). The computer selects a set of images that relate to the detected features in the screenshot of the webpage (step 1016). The computer inserts the set of images that relate to the detected features into the webpage to generated an enhanced webpage (step 1018). The computer displays the enhanced webpage with the inserted set of images on the website (step 1020). Thereafter, the process terminates.

It should be noted that the computer may perform steps of FIG. 9 and steps of FIG. 10 concurrently. In other words, the computer may rearrange, add, and/or remove webpage features and insert images related to detected webpage features to enhance user experience.

Thus, illustrative embodiments of the present invention provide a computer-implemented method, computer system, and computer program product for using forecasted human behavior trends in a convolutional neural network to predict future web analytics values corresponding to a set of digital content variables of interest within digital content of a webpage on a website at a future time. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for modifying digital content based on predicted future user behavior, the computer-implemented method comprising:
    identifying, by a computer, trends in propagation values corresponding to a layer of nodes in an artificial neural network based on measuring the propagation values at each run of the artificial neural network;
    forecasting, by the computer, the trends in the propagation values corresponding to the layer of nodes in the artificial neural network to generate predicted propagation values at a specified future point in time;
    applying, by the computer responsive to the computer forecasting the trends in the propagation values, the predicted propagation values to the layer of nodes in the artificial neural network, wherein the predicted propagation values that are applied to the layer of nodes in the artificial neural network are generated per the forecasting the trends in the propagation values;
    generating, by the computer, predicted website analytics values corresponding to a set of website variables of interest for the specified future point in time based on running the artificial neural network with the predicted propagation values; and
    modifying, by the computer, a website corresponding to the set of website variables of interest based on the predicted website analytics values corresponding to the set of website variables of interest for the specified future point in time.

2. The computer-implemented method of claim 1 further comprising:
    displaying, by the computer, the modified website on requesting client devices.

3. The computer-implemented method of claim 1 further comprising:
    running, by the computer, at a plurality of different time periods, the artificial neural network to identify current website analytics values corresponding to the set of website variables of interest at that particular period of time; and
    measuring, by the computer, at each run of the artificial neural network, the propagation values for weights, biases, and activation functions of the layer of nodes in the artificial neural network that correspond to the current website analytics values.

4. The computer-implemented method of claim 1 further comprising:
    receiving, by the computer, a request to access the website that includes a set of webpages from a client device via a network;
    capturing, by the computer, a screenshot of a webpage in the set of webpages having a highest number of client device user visits; and
    recording, by the computer, interactions by a user of the client device with features of the webpage having the highest number of client device user visits.

5. The computer-implemented method of claim 4 further comprising:
    combining, by the computer, the screenshot of the webpage with the interactions by the user of the client device with the features of the webpage to generate training data for a convolutional neural network; and
    training, by the computer, the convolutional neural network using the training data of combined webpage screenshot and user feature interaction data.

6. The computer-implemented method of claim 5 further comprising:
    recording, by the computer, backpropagation values corresponding to weights, biases, and activation functions during a fully connected stage of the convolutional neural network;
    trending, by the computer, differences in the backpropagation values corresponding to the weights, biases, and activation functions over a period of time;
    forecasting, by the computer, value gradients in the backpropagation values corresponding to the weights, biases, and activation functions for different layers of time; and
    completing, by the computer, the training of the convolutional neural network based on the value gradients in the backpropagation values corresponding to the weights, biases, and activation functions for the different layers of time.

7. The computer-implemented method of claim 6 further comprising:
    forecasting, by the computer, future analytic values corresponding to the features of the webpage having the highest number of client device user visits using the trained convolutional neural network;
    rearranging, by the computer, the features of the webpage having the highest number of client device user visits based on the forecasted future analytic values; and
    displaying, by the computer, the webpage with rearranged features on the website to enhance user experience.

8. The computer-implemented method of claim 4 further comprising:
    inputting, by the computer, the screenshot of the webpage into a convolutional neural network trained on value gradients in backpropagation values corresponding to weights, biases, and activation functions of website features of interest over different layers of time;
    selecting, by the computer, a particular layer of nodes corresponding to a specified future time period in the convolutional neural network based on processing the screenshot of the webpage; and
    identifying, by the computer, weights of the particular layer of nodes corresponding to the specified future time period.

9. The computer-implemented method of claim 8 further comprising:
    exporting, by the computer, the weights of the particular layer of nodes corresponding to the specified future time period to a residual neural network that utilizes computer vision to detect features in the screenshot of the webpage; and
    detecting, by the computer, the features in the screenshot of the webpage having the highest number of client device user visits using the residual neural network.

10. The computer-implemented method of claim 9 further comprising:
    selecting, by the computer, a set of images that relate to the detected features in the screenshot of the webpage;
    inserting, by the computer, the set of images that relate to the detected features into the webpage to generate an enhanced webpage; and displaying, by the computer, the enhanced webpage with the inserted set of images on the website.

11. A computer system for modifying digital content based on predicted future user behavior, the computer system comprising:
a bus system;
a storage device connected to the bus system, wherein the storage device stores program instructions; and
a processor connected to the bus system, wherein the processor executes the program instructions to:
identify trends in propagation values corresponding to a layer of nodes in an artificial neural network based on measuring the propagation values at each run of the artificial neural network;
forecast the trends in the propagation values corresponding to the layer of nodes in the artificial neural network to generate predicted propagation values at a specified future point in time;
apply, responsive to forecasting the trends in the propagation values, the predicted propagation values to the layer of nodes in the artificial neural network, wherein the predicted propagation values that are applied to the layer of nodes in the artificial neural network are generated per the forecast the trends in the propagation values;
generate predicted website analytics values corresponding to a set of website variables of interest for the specified future point in time based on running the artificial neural network with the predicted propagation values; and
modify a website corresponding to the set of website variables of interest based on the predicted website analytics values corresponding to the set of website variables of interest for the specified future point in time.

12. The computer system of claim 11, wherein the processor further executes the program instructions to:
display the modified website on requesting client devices.

13. The computer system of claim 11, wherein the processor further executes the program instructions to:
run, at a plurality of different time periods, the artificial neural network to identify current website analytics values corresponding to the set of website variables of interest at that particular period of time; and
measure, at each run of the artificial neural network, the propagation values for weights, biases, and activation functions of the layer of nodes in the artificial neural network that correspond to the current website analytics values.

14. A computer program product for modifying digital content based on predicted future user behavior, the computer program product comprising a computer readable storage medium having program instructions embodied therewith, the program instructions executable by a computer to cause the computer to perform a method comprising:
identifying, by the computer, trends in propagation values corresponding to a layer of nodes in an artificial neural network based on measuring the propagation values at each run of the artificial neural network;
forecasting, by the computer, the trends in the propagation values corresponding to the layer of nodes in the artificial neural network to generate predicted propagation values at a specified future point in time;
applying, by the computer responsive to the computer forecasting the trends in the propagation values, the predicted propagation values to the layer of nodes in the artificial neural network, wherein the predicted propagation values that are applied to the layer of nodes in the artificial neural network are generated per the forecasting the trends in the propagation values;
generating, by the computer, predicted website analytics values corresponding to a set of website variables of interest for the specified future point in time based on running the artificial neural network with the predicted propagation values; and
modifying, by the computer, a website corresponding to the set of website variables of interest based on the predicted website analytics values corresponding to the set of website variables of interest for the specified future point in time.

15. The computer program product of claim 14 further comprising:
displaying, by the computer, the modified website on requesting client devices.

16. The computer program product of claim 14 further comprising:
running, by the computer, at a plurality of different time periods, the artificial neural network to identify current website analytics values corresponding to the set of website variables of interest at that particular period of time; and
measuring, by the computer, at each run of the artificial neural network, the propagation values for weights, biases, and activation functions of the layer of nodes in the artificial neural network that correspond to the current website analytics values.

17. The computer program product of claim 14 further comprising:
receiving, by the computer, a request to access the website that includes a set of webpages from a client device via a network;
capturing, by the computer, a screenshot of a webpage in the set of webpages having a highest number of client device user visits; and
recording, by the computer, interactions by a user of the client device with features of the webpage having the highest number of client device user visits.

18. The computer program product of claim 17 further comprising:
combining, by the computer, the screenshot of the webpage with the interactions by the user of the client device with the features of the webpage to generate training data for a convolutional neural network; and
training, by the computer, the convolutional neural network using the training data of combined webpage screenshot and user feature interaction data.

19. The computer program product of claim 18 further comprising:
recording, by the computer, backpropagation values corresponding to weights, biases, and activation functions during a fully connected stage of the convolutional neural network;
trending, by the computer, differences in the backpropagation values corresponding to the weights, biases, and activation functions over a period of time;
forecasting, by the computer, value gradients in the backpropagation values corresponding to the weights, biases, and activation functions for different layers of time; and
completing, by the computer, the training of the convolutional neural network based on the value gradients in the backpropagation values corresponding to the weights, biases, and activation functions for the different layers of time.

20. The computer program product of claim 19 further comprising:
- forecasting, by the computer, future analytic values corresponding to the features of the webpage having the highest number of client device user visits using the trained convolutional neural network;
- rearranging, by the computer, the features of the webpage having the highest number of client device user visits based on the forecasted future analytic values; and
- displaying, by the computer, the webpage with rearranged features on the website to enhance user experience.

* * * * *